United States Patent
Trivedi (10) Patent No.: US 8,491,028 B2
(45) Date of Patent: Jul. 23, 2013

(54) CONSOLE SLIDING LID LOCATOR

(75) Inventor: Alpesh Trivedi, Northville, MI (US)

(73) Assignee: Nissan North America, Inc., Franklin, TN (US)

( * ) Notice: Subject to any disclaimer, the term of this patent is extended or adjusted under 35 U.S.C. 154(b) by 471 days.

(21) Appl. No.: 12/899,242

(22) Filed: Oct. 6, 2010

(65) Prior Publication Data

US 2012/0085034 A1  Apr. 12, 2012

(51) Int. Cl.
*B60R 13/00* (2006.01)

(52) U.S. Cl.
USPC ............................................... 296/24.34

(58) Field of Classification Search
USPC ............ 296/24.34, 191, 203.04, 29; 206/454; 40/299.01; 220/270; 141/98
See application file for complete search history.

(56) References Cited

U.S. PATENT DOCUMENTS

| | | | |
|---|---|---|---|
| 5,845,965 A | 12/1998 | Heath et al. | |
| 6,045,173 A * | 4/2000 | Tiesler et al. | 296/37.8 |
| 6,419,314 B1 * | 7/2002 | Scheerhorn | 297/188.19 |
| 6,719,367 B2 * | 4/2004 | Mic et al. | 297/188.19 |
| 7,029,049 B2 * | 4/2006 | Rockafellow et al. | 296/37.8 |
| 7,413,229 B2 * | 8/2008 | Kukucka et al. | 296/24.34 |
| 7,416,235 B2 * | 8/2008 | Rajappa et al. | 296/37.8 |
| 7,431,365 B2 | 10/2008 | Sturt et al. | |
| 7,537,287 B2 | 5/2009 | Wieczorek et al. | |
| 7,614,674 B2 * | 11/2009 | Shiono et al. | 296/24.34 |
| 7,770,953 B2 * | 8/2010 | Koarai | 296/24.34 |
| 7,954,663 B2 * | 6/2011 | DePue | 220/813 |
| 8,002,323 B2 * | 8/2011 | Jones et al. | 296/37.1 |
| 8,235,442 B2 * | 8/2012 | Spitler et al. | 296/24.34 |
| 2006/0279123 A1 * | 12/2006 | Bazinski et al. | 297/411.35 |
| 2007/0046058 A1 * | 3/2007 | Busha et al. | 296/37.8 |
| 2007/0132284 A1 * | 6/2007 | Ekladyous et al. | 297/188.17 |
| 2010/0078954 A1 * | 4/2010 | Liu et al. | 296/24.34 |
| 2010/0156129 A1 * | 6/2010 | Evans et al. | 296/24.34 |
| 2011/0215606 A1 * | 9/2011 | Trivedi | 296/24.34 |
| 2012/0043778 A1 * | 2/2012 | Brant | 296/24.34 |
| 2012/0261936 A1 * | 10/2012 | Spitler et al. | 296/24.34 |
| 2013/0062899 A1 * | 3/2013 | Stoia | 296/24.34 |

* cited by examiner

*Primary Examiner* — Kiran B Patel (74) *Attorney, Agent, or Firm* — Young, Basile, Hanlon & MacFarlane P.C.

(57) ABSTRACT

Disclosed herein are embodiments of vehicle storage compartments having closure panel assemblies that can comprise a first lid portion having a first lid surface on which a locating channel having opposing side walls is formed and a second lid portion on which first and second locating projections are formed. At least a portion of each of the first and second locating projections is received within the locating channel when the first and second lid portions are engaged. One of the first and second lid portions is moveable relative the other of the first and second lid portions between extended and retracted positions. The first and second locating projections are spaced apart in a direction of travel of the one of the first and second lid portions. The locating channel includes first and second reduced-width sections that contact the first and second locating projections, respectively, in the retracted position.

20 Claims, 10 Drawing Sheets

CONSOLE SLIDING LID LOCATOR

TECHNICAL FIELD

The present invention generally pertains to vehicle consoles with sliding lid arrangements.

BACKGROUND

It is common for vehicles to include a console structure between the front driver and passenger seats. Vehicle consoles often function as storage compartments and arm rests. Consoles can typically include hinged closure panels or lids that function to conceal items that are stored within the consoles. It is becoming more common for vehicle designs to include console lids that have a sliding function. Console lids that slide forward can provide additional arm rest area, convenient writing surfaces, and/or increased area on which to support items such as lap top computers without taking up more room within a passenger compartment. Sliding console lids typically include an upper portion that slides relative to a lower portion. In some designs, a surface of the upper portion slides directly against a surface of the lower portion. However, even if the surfaces comprise low-friction materials, the sliding motion can be inconsistent and the surfaces can still wear over time. Additionally, if the console lid is particularly large or heavy, as is often the case with commercial vehicles, the upper portion may be very difficult or impossible to slide relative to the lower portion.

Other sliding console lid designs include one or more slide rails (e.g., similar to those found in steel drawer cabinets) that allow the upper portion to slide relative to the lower portion along a ball bearing raceway. In this case, separate portions of each slide rail are attached to respective upper and lower portions of the console lid. However, while a slide rail can provide a smoother and sturdier sliding motion, proper alignment of the upper and lower portions of the console lid prior to attachment of the slide rail can be difficult.

SUMMARY

Embodiments of a vehicle storage compartment having a closure panel assembly are disclosed herein. In one such embodiment, the closure panel assembly comprises a first lid portion having a first lid surface on which a locating channel having opposing side walls is formed. A second lid portion has a second lid surface facing the first lid portion and on which first and second locating projections are formed. At least a portion of each of the first and second locating projections is configured to be received within the locating channel when the first lid portion is engaged with the second lid portion. One of the first and second lid portions is slidably moveable relative the other of the first and second lid portions between extended and retracted positions. The first and second locating projections are spaced apart in a direction of travel of the one of the first and second lid portions. The locating channel includes first and second reduced-width sections that contact the first and second locating projections, respectively, when the one of the first and second lid portions is in the retracted position.

Another embodiment of a closure panel assembly for a vehicle console comprises a first lid portion having a first lid surface on which a locating channel is formed, the locating channel having opposing side walls with first and second reduced-width sections. A second lid portion has a second lid surface facing the first lid surface and has first and second locating projections extending from the second lid surface. At least a portion of each of the first and second locating projections is received within the locating channel when the first lid portion is engaged with the second lid portion. The first lid portion is slidably moveable relative to the second lid portion between extended and retracted positions. The first and second locating projections are spaced apart in a direction of travel of the first lid portion. The first and second locating projections contact the first and second reduced-width sections of the locating channel, respectively, when the first lid portion is in the retracted position and are outside of the first and second reduced-width sections when the first lid portion is in the extended position. The first and second locating projections do not contact the opposing side walls of the locating channel when the first lid portion is in the extended position.

These and other embodiments of the invention are described in additional detail hereinafter.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
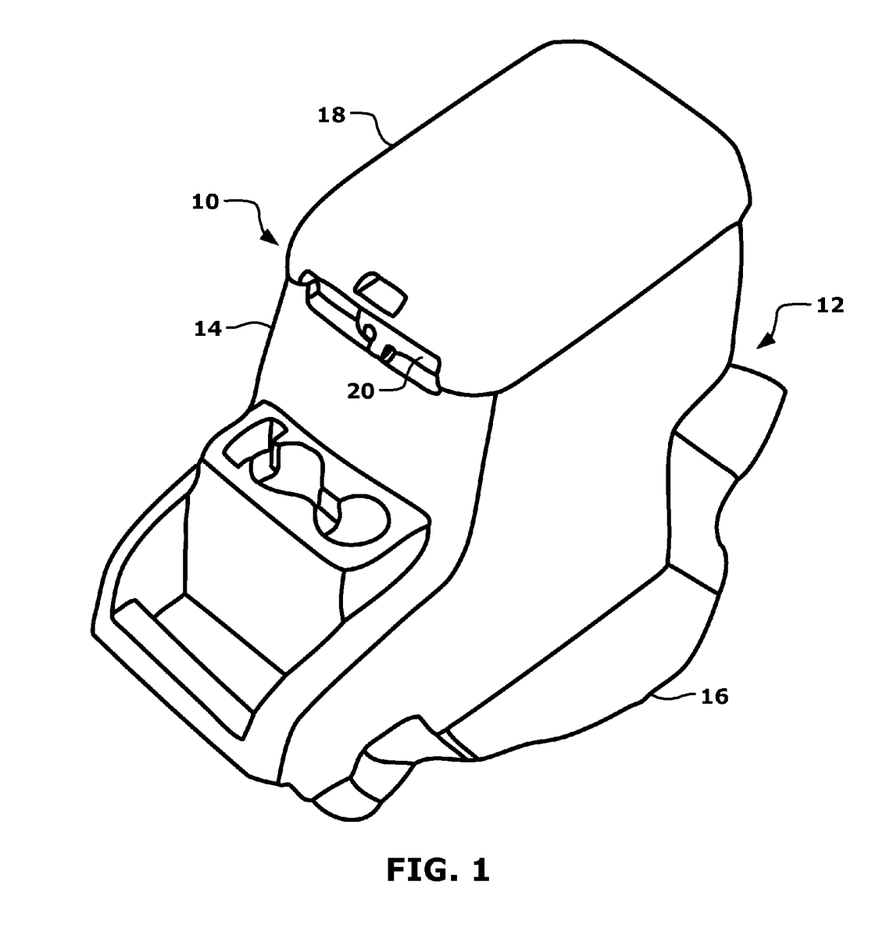
FIG. 1 is a perspective view of a vehicle storage compartment having a sliding closure panel installed to a vehicle body panel.

FIG. 1 illustrates a storage compartment 10 located in a vehicle 12. The storage compartment 10 can be configured as a center-mounted console to be located between two seats, such as the driver and front passenger seat. In FIG. 1, the storage compartment 10 has a body portion 14 that is secured to a body panel 16 of the vehicle 12. As is typical, one or more cup holders can be provided either integral with the body portion 14 or extending from the body portion 14. A closure panel 18 is shown in the closed position with respect to the body portion 14. The closure panel 18 can move between the closed position and an open position in which access to a compartment or cavity is provided. The cavity can be a single cavity or can be more than one cavity separated by walls within the body portion 14. A securing apparatus 20 is coupled to the closure panel 18 and generally has a latch that engages a corresponding engaging portion on the body portion 14 so as to secure items in the cavity. The latch of the securing apparatus 20 also disengages from engaging portion so as to allow access to the cavity. The body portion 14 and closure panel 18 generally comprise a plastic material as known to those skilled in the art.

The closure panel 18 has a surface area sufficient to cover at least a portion of the opening when the closure panel 18 is in the closed position. As shown in FIG. 1, closure panel 18 completely covers the opening. The closure panel 18 undergoes rotational movement between the closed and open positions with respect to the body portion 14 through the use of a hinge member (not shown). One example of a hinge member that can be incorporated into the storage compartment embodiments as disclosed herein can be found in U.S. patent application Ser. No. 12/635,739 to Spitler et al., filed Dec. 11, 2009 and incorporated herein by reference.

Figure 2:
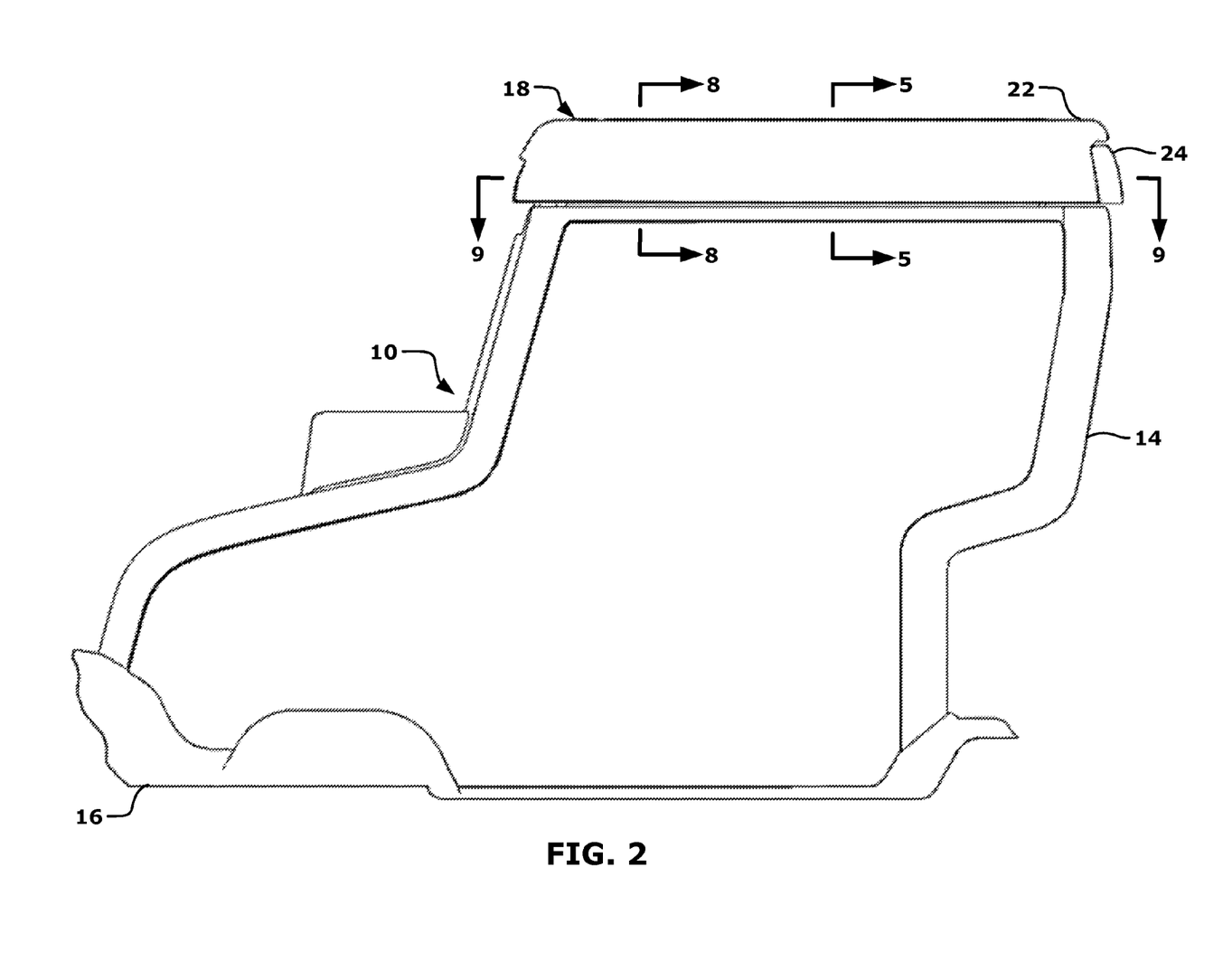
FIG. 2 is a side view of the storage compartment with the sliding closure panel in a fully retracted position.
Figure 3:
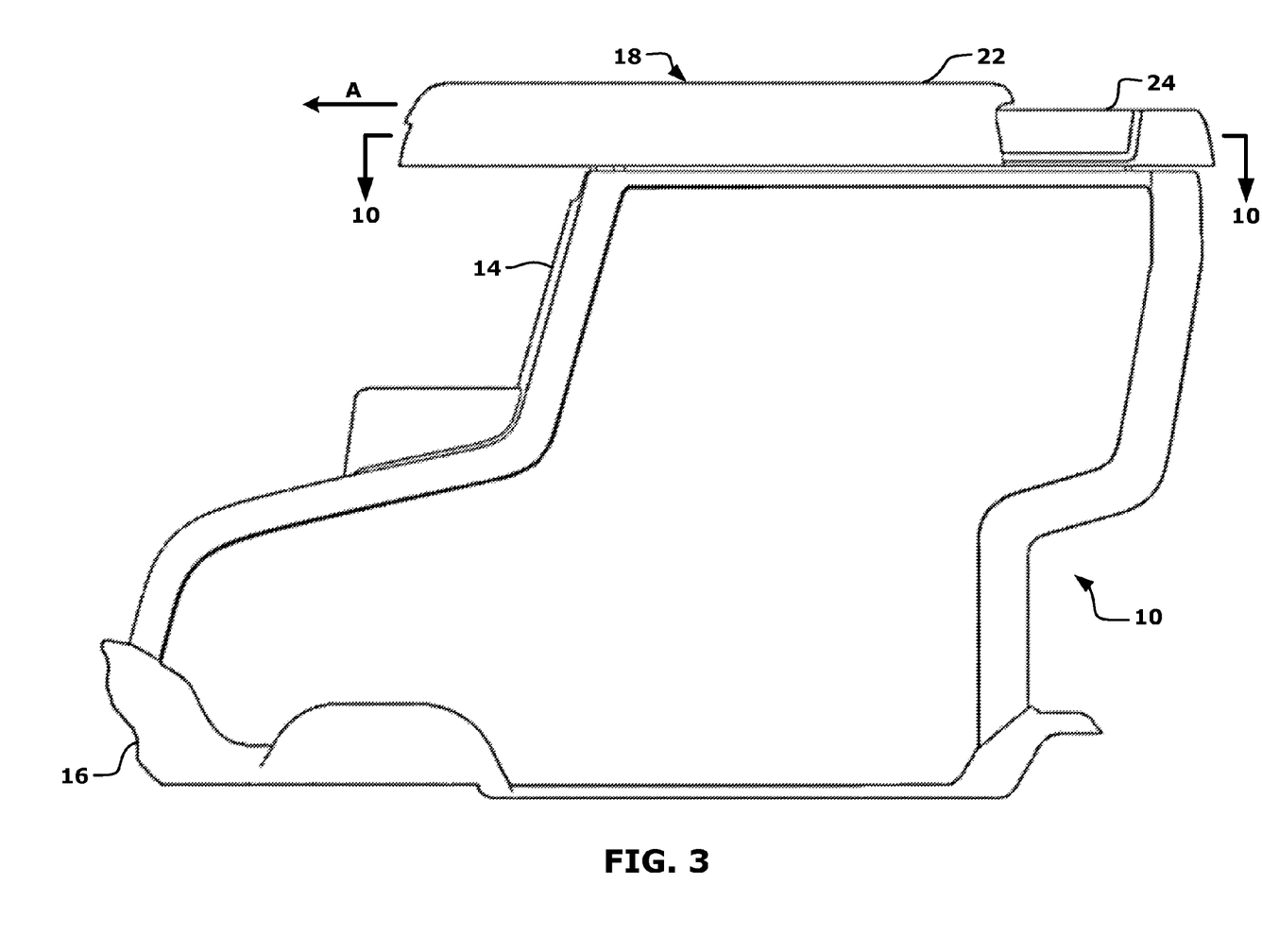
FIG. 3 is a side view of the storage compartment with the sliding closure panel in a partially extended position.

FIG. 2 is a side view of the storage compartment 10 shown in FIG. 1. The closure panel 18 has an upper lid portion 22 and a lower lid portion 24. The upper lid portion 22 and lower lid portion 24 are configured to be slidably movable with respect to each other. That is, as shown in FIG. 2, upper lid portion 22 and lower lid portion 24 are aligned over the opening in a retracted position. FIG. 3 shows the upper lid portion 22 moving toward the extended position. In the extended position, upper lid portion 22 slides in a direction of travel shown by arrow A with respect to lower lid portion 24. The direction of travel will be, for example, parallel to a fore-to-aft direction of the vehicle 12 when the storage compartment 10 is a center-mounted storage console.

Figure 4:
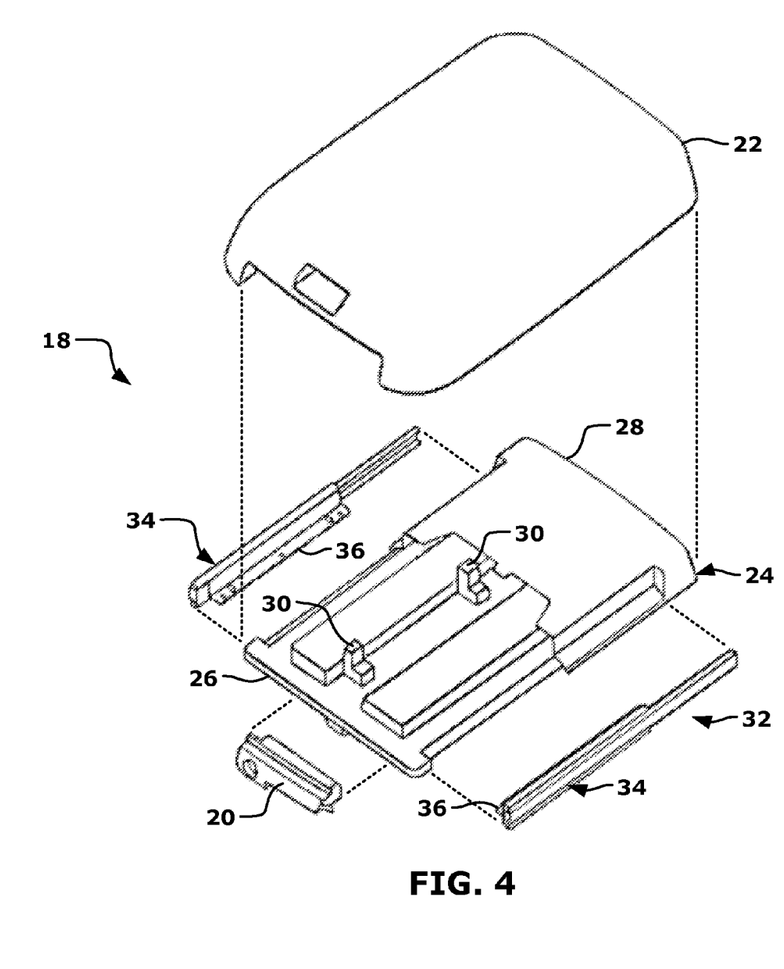
FIG. 4 is an exploded perspective view showing components that comprise the sliding closure panel.

FIG. 4 is an exploded perspective view showing components of the closure panel 18. The figures illustrate certain components located on the upper lid portion 22 and certain components on the lower lid portion 24. However, it is contemplated that the components can be reversed, with those shown on the upper lid portion 22 actually being located on the lower lid portion 24, and those shown on the lower lid portion 24 likewise being located on the upper lid portion 22. Whether on the upper or lower lid portion 22, 24, the components perform the same function.

As seen in FIG. 4, the lower lid portion 24 has a base portion 26 and a cover portion 28. The lower lid portion 24 also has a finisher plate 27, best seen in FIG. 5, to provide a finished aesthetic when the closure panel 18 is in the open position. The cover portion 28 encloses at least the part of the base portion 26 that is exposed when the upper lid portion 22 slides to the extended position. Locating projections 30 extend from the base portion 26 and will be explained in more detail below.

Also shown in FIG. 4 is a slide rail mechanism 32 that is coupled to both the upper and lower lid portions 22, 24 to facilitate sliding movement of the upper lid portion 22. The slide rail mechanism 32 shown in the figures comprises two slide rails 34 each with a mounting bracket 36; however, it is contemplated that embodiments may also include a single slide rail 34 with a mounting bracket 36 to provide the sliding movement of the closure panel 18.

Figure 5:
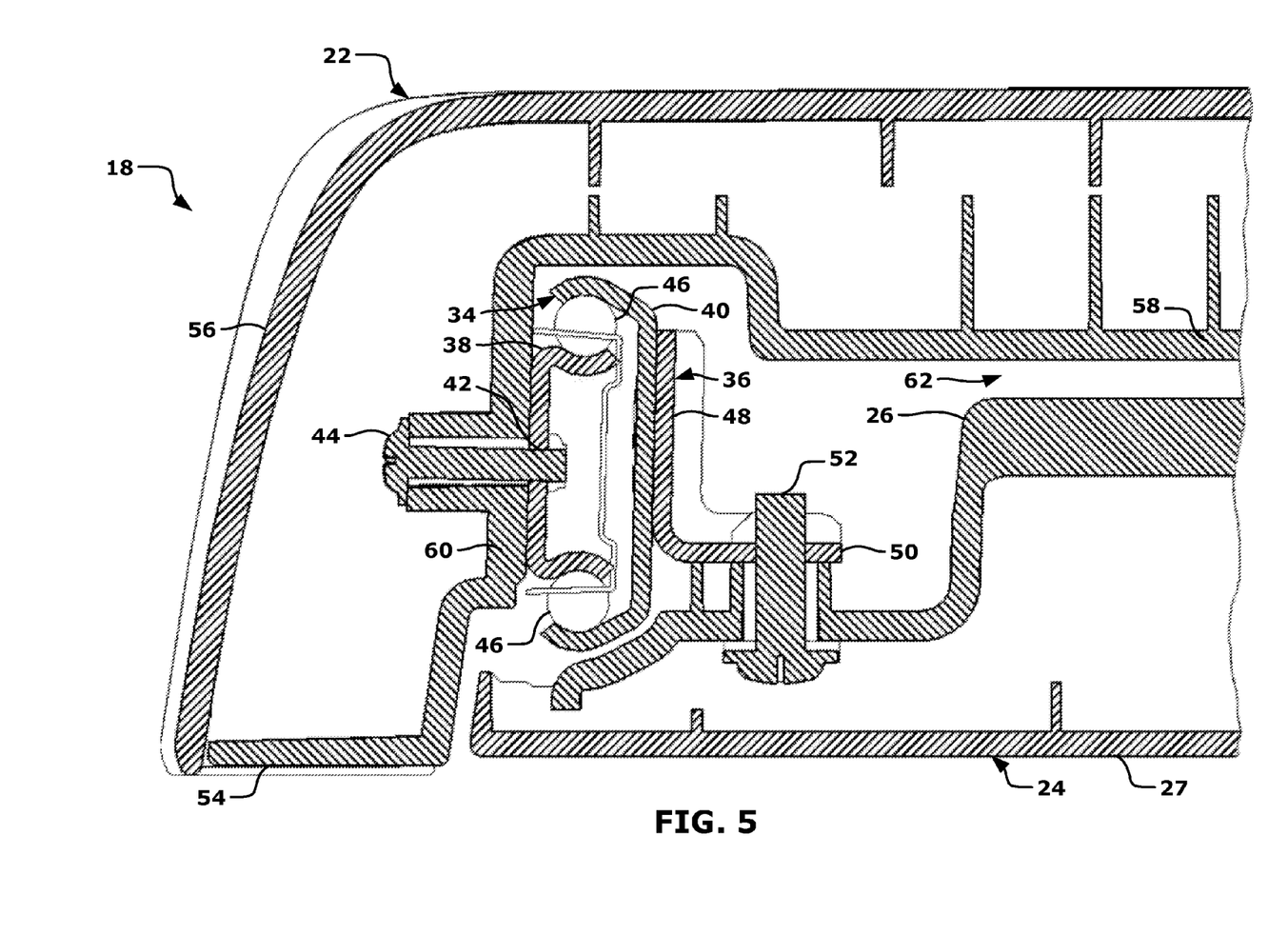
FIG. 5 is a partial vertical section along line 5-5 in FIG. 2 showing connections between an upper lid portion and a lower lid portion through a slide rail mechanism.

FIG. 5 is a partial vertical section along line 5-5 in FIG. 2 showing the connection between the upper lid portion 22 and the lower lid portion 24 through the slide rail mechanism 32. The slide rail 34 has an inner rail 38 having at least one aperture 42 that aligns with an aperture in the upper lid portion 22. The slide rail 34 is attached to the upper lid portion 22 through the one or more apertures 42 with inner rail fasteners 44. One or more bearings 46 are located between the inner and outer rails 38, 40 allowing the inner rail 38 to slide smoothly along the outer rail 38 when the upper lid portion 22 is moved to the extended position.

The mounting bracket 36 has a vertical leg 48 that is attached to the outer rail 40 of the slide rail 34, and a horizontal leg 50 extending from the vertical leg 48 to form approximately a right angle with the vertical leg 48. The horizontal leg 50 of the mounting bracket 36 is attached to the base portion 26 of the lower lid portion 24 with one or more horizontal leg fasteners 52. Accordingly, the base portion 26, mounting bracket 36 and outer rail 40 remain stationary in relation to the inner rail 42 and upper lid portion 22 when the upper lid portion 22 is moved to the extended position.

As shown in FIG. 5, the upper lid portion 22 can have an inner member 54 and an outer member 56, the inner member 54 received within the outer member 56. The inner member 54 can have a first surface 58 bounded by opposing side walls 60 defining a concave mounting recess 62. The inner rail 38 can be attached to a side wall 60 within the concave mounting recess 62.

Figure 6:
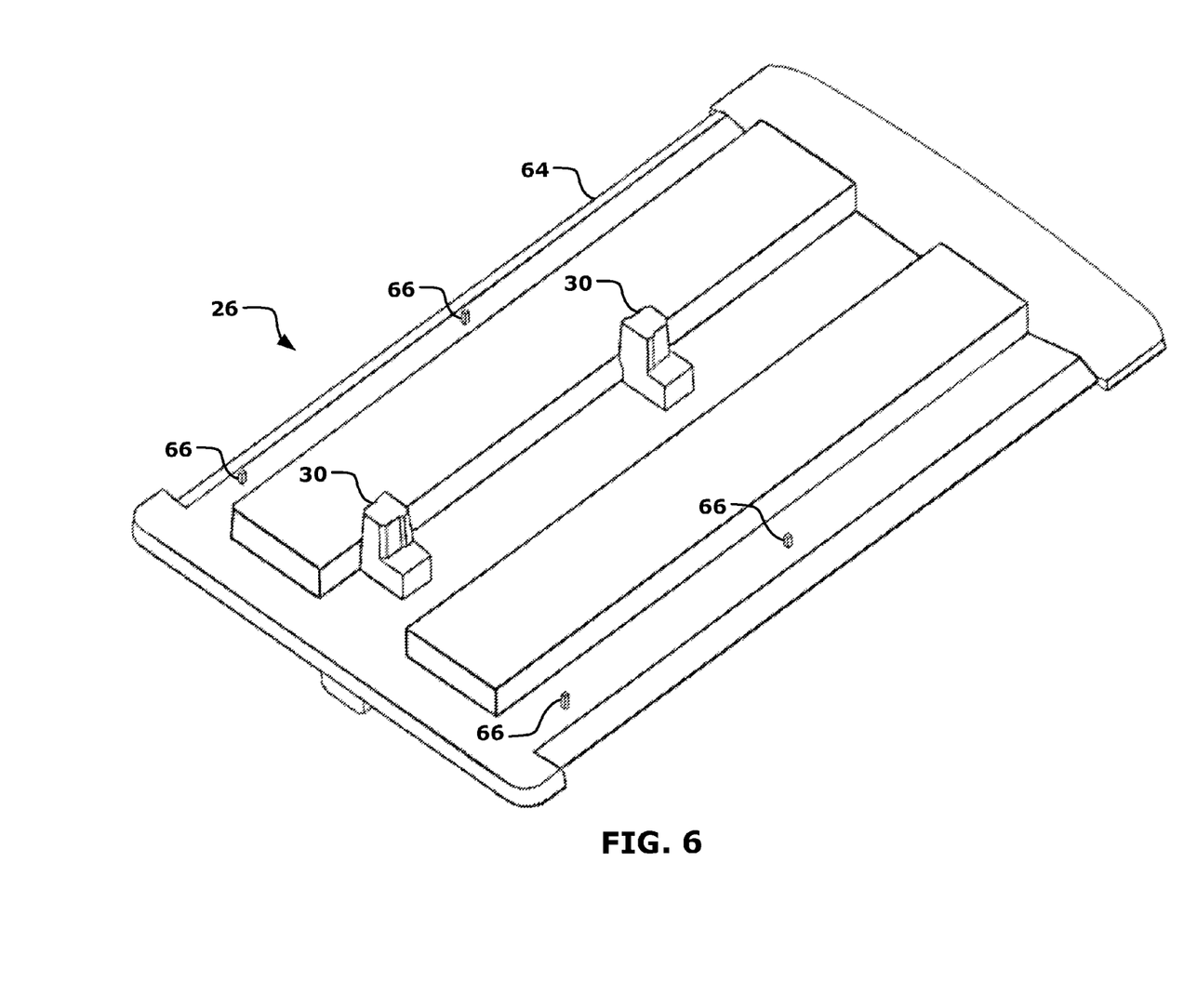
FIG. 6 is a perspective view of the base portion of the lower lid portion showing locating projections.

FIG. 6 shows the base portion 26, and in particular shows a surface 64 of the base portion that faces the upper lid portion 22. One or more locating pins 66 extend from the surface 64 of the base portion 26 and are positioned to cooperate with elongated apertures 68 (best seen in FIG. 7) located on the horizontal leg 50 of each mounting bracket 36. As shown, two locator pins are spaced apart on opposing sides of the base portion 26. However, any number of locator pins 66 can be used and may be located to cooperate with an equal number of elongated apertures 68 on one or more mounting brackets 36.

During manufacture of the closure panel 18, the locator pins 66 and elongated apertures are used to position the lower lid portion 24 relative to the upper lid portion 22 in the direction of extension or travel of the upper lid portion 22, at which time the fasteners are installed. The elongated aperture 68 allows for manufacturing tolerances in the upper lid portion 22 and base portion 26. However, this allowance can result in improper alignment which can cause the upper lid portion 22 to move relative to the lower lid portion 24 in a direction other than the direction of travel, which can cause unintended contact between the upper and lower lid portions 22, 24, impeding sliding movement.

Figure 7:
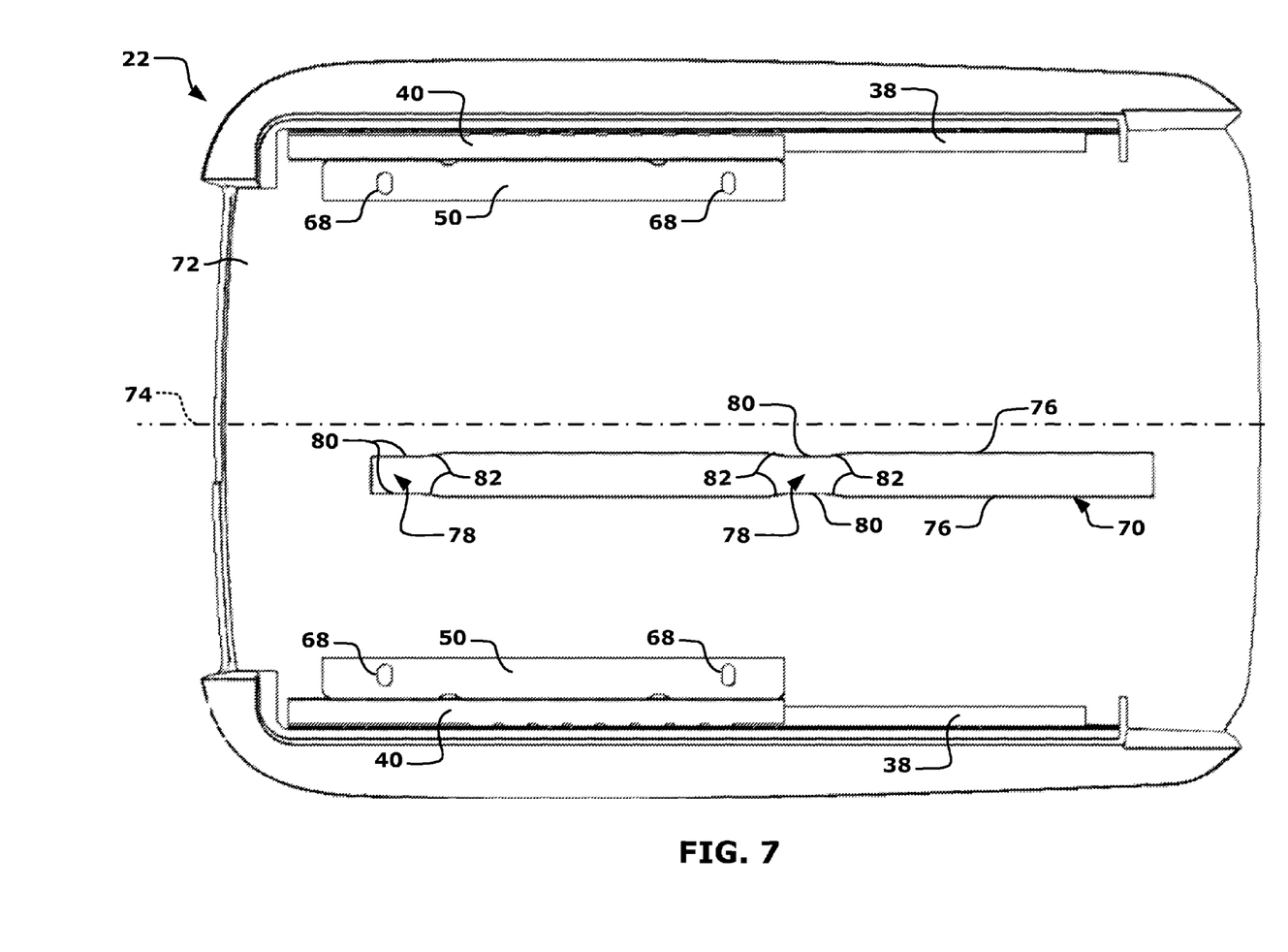
FIG. 7 is a bottom view of the upper lid portion showing a channel that receives the locating projections of the lower lid portion.

A portion of each of the locating projections 30 shown in FIG. 6 is received within a locating channel 70 in the upper lid portion 22 shown in FIG. 7 to align the upper and lower lid portions 22, 24 with respect to each other in a direction other than the direction of travel of the upper lid portion 22 when the upper and lower lid portions 22, 24 are engaged with one another. The cooperation between the locating projections 30 and the locating channel 70 provides for reliable and repeatable engagement of the upper and lower lid portions 22, 24 in order to ensure smooth and consistent sliding movement of the upper lid portion 22 relative to the lower lid portion 24.

FIG. 7 is a bottom view of the upper lid portion 22 showing the locating channel 70 that receives the locating projections 30. The locating channel 70 is formed in a surface 72 of the upper lid portion 22 that faces the lower lid portion 24 of the closure panel 18. As shown, the locating channel 70 can span at least a majority of a length of the upper lid portion 22 and extends in the direction of travel of the upper lid portion 22. The locating channel 70 can be laterally spaced from a longitudinal center axis 74 of the upper lid portion 22. The locating channel 70 is shown by way of example. It is contemplated that the locating channel 70 may be two rails or side walls that are attached to the lid, thereby forming a channel.

Figure 10:
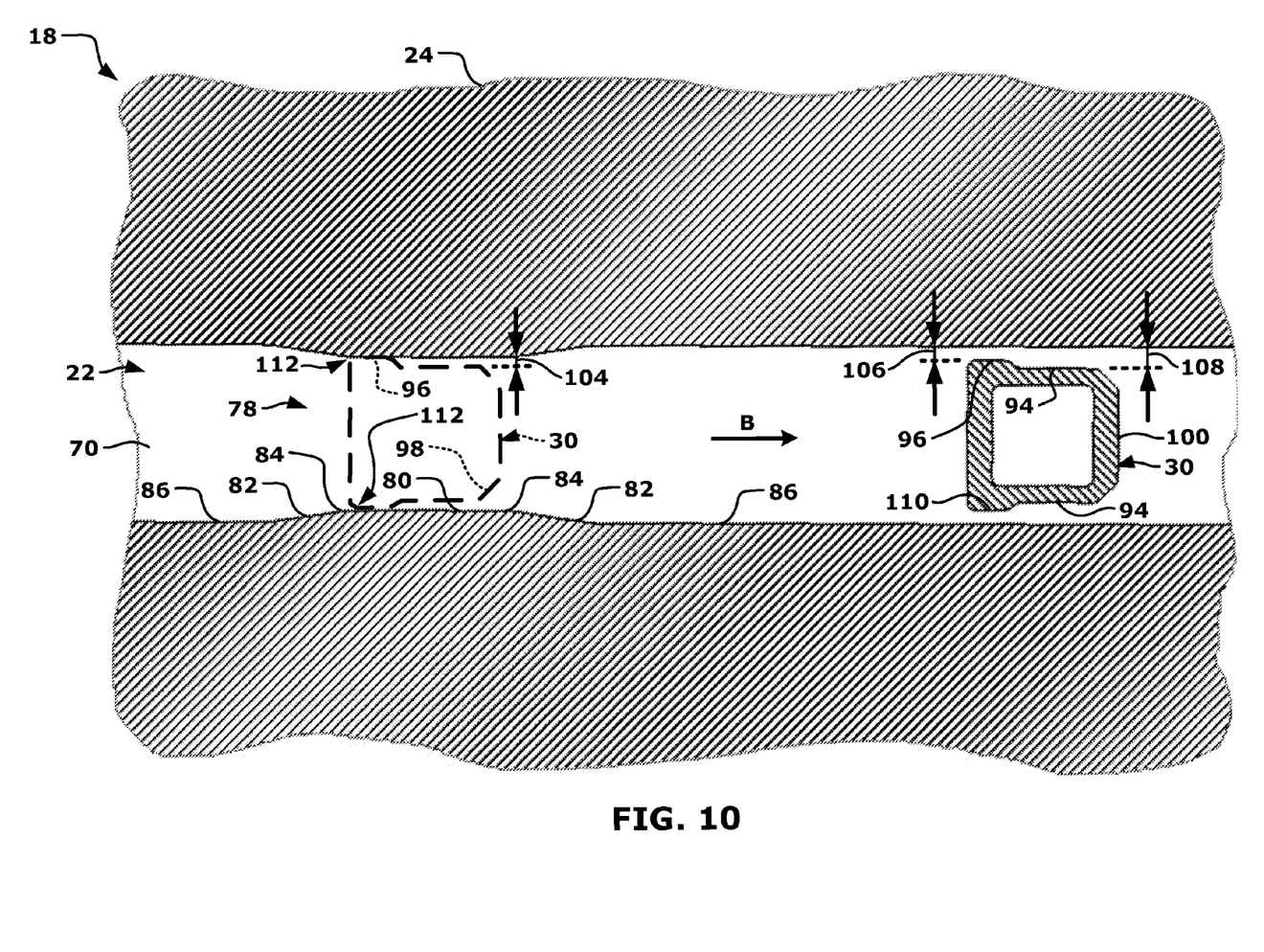
FIG. 10 is a partial horizontal section along line 10-10 in FIG. 3 illustrating gaps between a locating projection and walls of the channel when the closure panel is in the fully retracted position and the fully extended position.

Side walls 76 of the locating channel 70 include tapered portions 78 associated with each of the locating projections 30. Accordingly, two tapered portions 78 are shown. The tapered portions 78 represent isolated areas along the length of the channel 70 that have a reduced width. Each of the tapered portions 78, also referred to as reduced-width sections 78, of the locating channel 70 can include opposing contact walls 80 and at least one inclined section 82. As best seen in FIG. 10, each of the inclined sections 82 extends between a lateral edge 84 of a respective contact wall 80 and an adjacent increased-width portion 86 of the locating channel 70. It is contemplated that the locating channel 70 may have only the tapered portions 78, with the side walls 76 ending at the end of the tapered portions 78. The side walls 76 can also be intermittent rather than continuous in the areas outside of the tapered portions 78.

Figure 8:
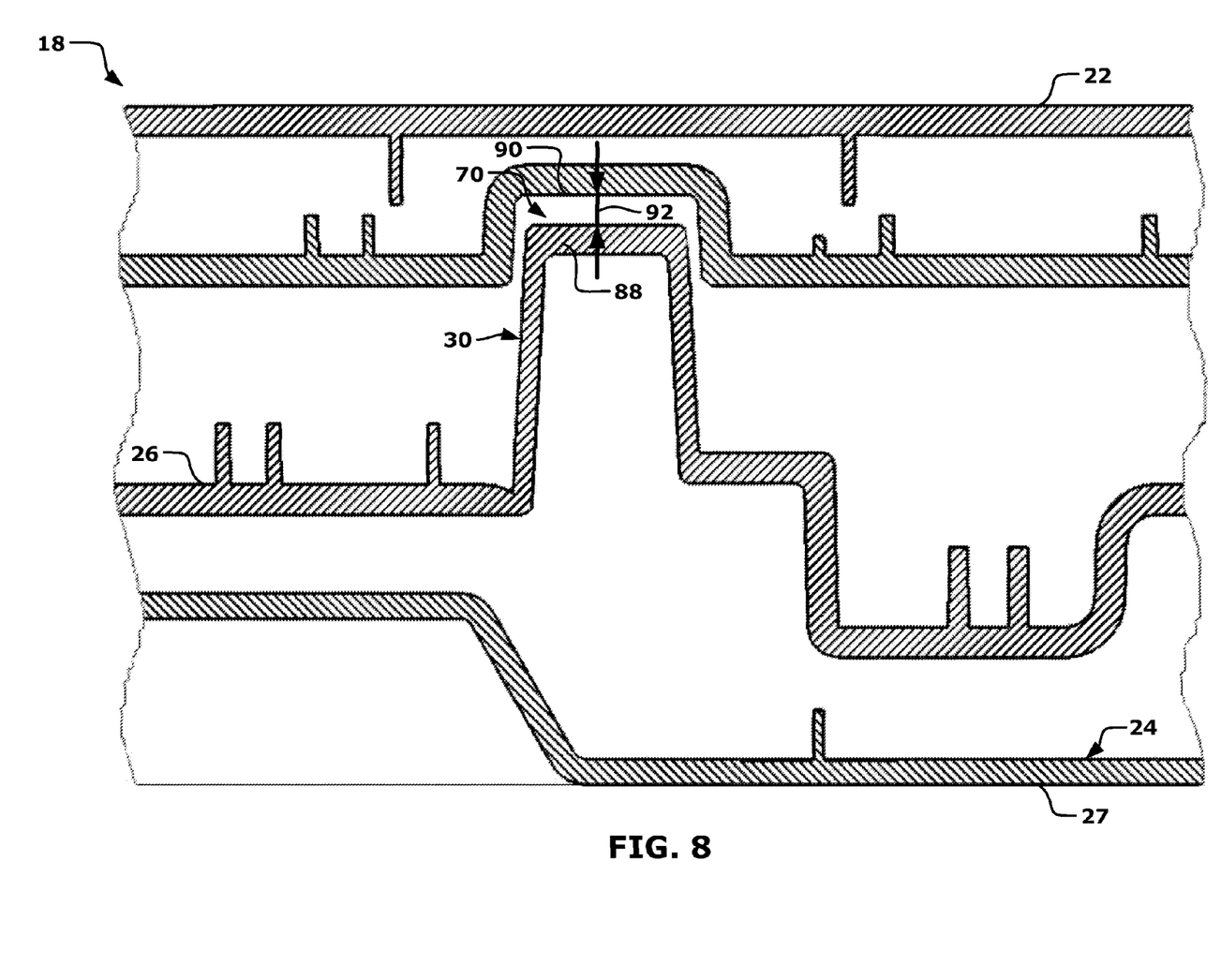
FIG. 8 is a partial vertical section along line 8-8 in FIG. 2 showing a locating projection received within the channel when the upper lid portion is installed to the lower lid portion.

Referring back to FIG. 6, two locating projections 30 extend from the base portion 26 of the lower lid portion 24. Although two locating projections 30 are shown, the use of more than two locating projections is contemplated. Furthermore, the shape is provided by way of example and it not meant to be limiting as long as the shape performs the functions discussed herein. The locating projections 30 are spaced apart in the direction of travel of the upper lid portion 22. FIG. 8 is a partial vertical section along line 8-8 in FIG. 2 showing a portion of the locating projection 30 received within the channel 70 when the upper lid portion 22 is installed to the lower lid portion 24. Each locating projection 30 has a distal end surface 88 and the locating channel 70 has a recessed back surface 90. Each distal end surface 88 is free from contact with the recessed back surface 90 when the upper and lower lid portions 22, 24 are engaged, leaving a gap 92 between the distal end surface 88 and the recessed back surface 90. The distal end surface 88 need not be an actual surface. The walls of the locating projection 30 may end with no surface spanning the ends. In this case, the ends would still not contact the recessed back surface 90.

As best seen in FIG. 10, each of the locating projections 30 includes opposing side surfaces 94 that each face a side wall 76 of the locating channel 70. Each of the side surfaces 94 includes a widened portion 96 configured to contact one of the reduced-width sections 78 of the locating channel 70 when the upper lid portion 22 is in the retracted position 98 illustrated with solid lines in FIG. 9 and broken lines in FIG. 10. The widened portion 96 on each side wall provides minimal contact with the reduced-width sections 78 of the locating channel 70 in a lateral direction when the upper lid portion 22 is in the fully retracted position 98. When the upper lid portion 22 is in the fully retracted position 98 and the locating projections 30 contact the tapered portions 78 of the locating channel 70, the upper and lower lid portions 22, 24 are properly located relative to one another during assembly so that the slide rail mechanism 32 can be attached to respective lid portions 22, 24 while ensuring a smooth sliding motion.

Figure 9:
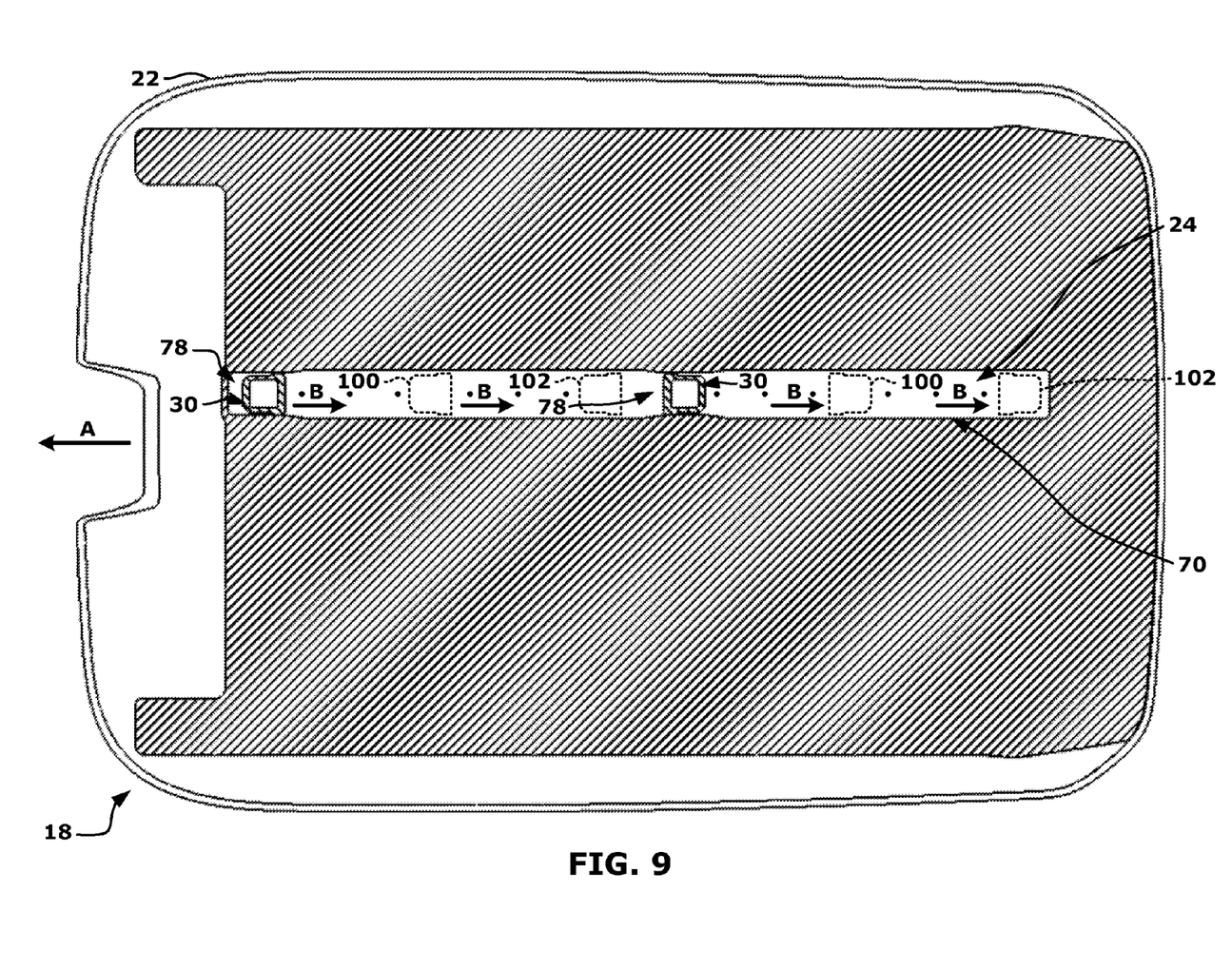
FIG. 9 is a horizontal section along line 9-9 in FIG. 2 showing relative positions of the locating projections within the channel as the closure panel moves from the fully retracted position to the fully extended position.

FIG. 9 illustrates the relationship between the locating projections 30 and the locating channel 70 during extension of the upper lid portion 22 along the travel direction A. The locating projections 30 depicted with the solid lines are in the positions shown in FIG. 9 when the upper lid portion 22 is in the retracted position. As the upper lid portion 22 is moved to the extended position, locating projections 30 move in the direction shown with arrows B within the locating channel 70. Position 100 corresponds to an intermediate position of the upper lid portion 22 and position 102 corresponds to the fully extended position of the upper lid portion 22. Since the locating projections 30 minimally contact the side walls 76 of the locating channel 70 only when the upper lid portion 22 is fully retracted, the locating projections 30 can travel along the locating channel 70 when the upper lid portion 22 is extended without impeding sliding movement in any manner.

FIG. 10 is a partial horizontal section along line 10-10 in FIG. 3 illustrating gaps between locating projections 30 and the side walls 76 of the locating channel 70 when the closure panel 18 is in the fully retracted position and the fully extended position. When the closure panel 18 is either partially extended or fully extended, the locating projections 30 have moved along the locating channel to an intermediate position 100 or a fully extended position 102 such that the reduced-width sections 78 of the locating channel 70 are free from contact with the widened portions 96 of the locating projections 30.

When the closure panel 18 is in the retracted position, the locating projections 30 relate to the locating channel 70 as shown in position 98. As shown, at least a portion of each of the widened portions 96 of the side walls 94 contacts a contact wall 80 of the reduced-width section 78 of the locating channel 70. At the same time a first gap 104 is maintained between portions of the side walls 94 not including the widened portions 96 and a contact wall 80 of the reduced-width section 78. In other words, when the closure panel 18 is in the retracted position, the clearance between at least a portion of the widened portion 96 of the locating projection 30 and a contact wall 80 of the reduced-width section 78 is zero.

When the closure panel 18 is not in the retracted position, the locating projections 30 relate to the locating channel 70 as shown in position 100. There is no longer any contact between the locating projections 30 and the locating channel 70. Rather, a second gap 106 is formed between at least a portion of each of the widened portions 96 and a corresponding side wall 76 of the locating channel 70. At the same time a third gap 108 is formed between portions of the side walls 94 not including the widened portions 96 and a corresponding side wall 76 of the locating channel 70. As shown in FIG. 10, the first gap 104 is smaller than the second gap 106 which is smaller than the third gap 108. The clearance between the widened portion 96 of the locating projections 30 and a side wall 76 of the locating channel 70 is greater than zero when the closure panel 18 moves to an extended position.

A surface 110 of each widened portion 96 can be tapered such that contact between the widened portion 96 and the contact wall 80 of a reduced-width section 78 of the locating channel 70 is minimal when the upper lid portion 22 is in the fully retracted position, thereby creating a negligible amount of friction. This minimal contact is represented by the contact points 112 shown in FIG. 10.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A closure panel assembly for a vehicle storage compartment comprising:
   a first lid portion having a first lid surface on which a locating channel having opposing side walls is formed; and
   a second lid portion having a second lid surface that faces the first lid portion and on which first and second locating projections are formed, at least a portion of each of the first and second locating projections configured to be received within the locating channel when the first lid portion is engaged with the second lid portion, wherein one of the first and second lid portions is slidably moveable relative the other of the first and second lid portions between extended and retracted positions, wherein the first and second locating projections are spaced apart in a direction of travel of the one of the first and second lid portions, and wherein the locating channel includes first and second reduced-width sections that contact the first and second locating projections, respectively, when the one of the first and second lid portions is in the retracted position.

2. The closure panel assembly of claim 1, wherein each of the first and second locating projections includes first and second side surfaces, the first side surface facing one of the opposing side walls of the locating channel and the second side surface facing the other of the opposing side walls of the locating channel, each of the side surfaces including widened portions configured to contact one of the first and second reduced-width sections of the locating channel when the one of the first and second lid portions is in the retracted position.

3. The closure panel assembly of claim 2, wherein a clearance between each of the opposing side walls of the locating channel and a widened portion of an adjacent one of the first and second side surfaces of the first and second locating projections is zero when the one of the first and second lid portions is in the retracted position and the clearance is greater than zero when the one of the first and second lid portions moves to the extended position.

4. The closure panel assembly of claim 1, wherein the locating channel spans at least a majority of a length of the first lid portion.

5. The closure panel assembly of claim 1, wherein the first and second reduced-width sections of the locating channel are free from contact with the first and second locating projections, respectively, when the one of the first and second lid portions is in the extended position.

6. The closure panel assembly of claim 1, wherein each of the first and second locating projections has a distal end surface and the locating channel has a recessed back surface, and wherein each distal end surface is free from contact with the recessed back surface when the first lid portion is engaged with the second lid portion.

7. The closure panel assembly of claim 1, wherein each of the reduced-width sections of the locating channel includes opposing contact walls and at least one inclined section, wherein each of the inclined sections extends between a lateral edge of a respective contact wall and an adjacent increased-width portion of the locating channel.

8. The closure panel assembly of claim 1 further comprising:
a slide rail mechanism coupled to both the first and second lid portions to facilitate sliding movement of the one of the first and second lid portions.

9. The closure panel assembly of claim 8, wherein the slide rail mechanism comprises a mounting bracket having at least one elongated aperture configured to receive a locator pin to position the first and second lid portions relative to each other in the direction of travel when the first and second lid portions are engaged.

10. The closure panel assembly of claim 9, wherein the slide rail mechanism further comprises first and second slide members, the first slide member being attached to the mounting bracket, the second slide member being coupled to one of the first and second lid portions, and the mounting bracket being coupled to the other of the first and second lid portions.

11. The closure panel assembly of claim 10, wherein the first lid surface of the first lid portion is bounded by opposing side walls defining a concave mounting recess, and wherein the second slide member is attached to one of the opposing side walls within the concave mounting recess.

12. The closure panel assembly of claim 1, wherein at least one of the first and second lid portions is dimensioned to cover an opening in the vehicle storage compartment.

13. The closure panel assembly of claim 12, wherein the vehicle storage compartment is a center-mounted storage console.

14. The closure panel assembly of claim 13, wherein the direction of travel is parallel to a fore-to-aft direction of a vehicle.

15. A closure panel assembly for a vehicle console comprising:
a first lid portion having a first lid surface on which a locating channel is formed, the locating channel having opposing side walls with first and second reduced-width sections; and
a second lid portion having a second lid surface facing the first lid surface and having first and second locating projections extending from the second lid surface,
wherein at least a portion of each of the first and second locating projections is received within the locating channel when the first lid portion is engaged with the second lid portion,
wherein the first lid portion is slidably moveable relative to the second lid portion between extended and retracted positions,
wherein the first and second locating projections are spaced apart in a direction of travel of the first lid portion,
wherein the first and second locating projections contact the first and second reduced-width sections of the locating channel, respectively, when the first lid portion is in the retracted position and are outside of the first and second reduced-width sections when the first lid portion is in the extended position, and
wherein the first and second locating projections do not contact the opposing side walls of the locating channel when the first lid portion is in the extended position.

16. The closure panel assembly of claim 15, wherein the locating channel spans at least a majority of a length of the first lid portion.

17. The closure panel assembly of claim 16, wherein the first lid portion has a longitudinal center axis, wherein the locating channel is laterally spaced from the longitudinal center axis.

18. The closure panel assembly of claim 15, further comprising:
a slide rail mechanism including first and second slide members, the first slide member being attached to the first lid portion; and
a mounting bracket attached to the second slide member, wherein the second lid portion is coupled to the mounting bracket.

19. The closure panel assembly of claim 18, wherein the mounting bracket includes at least one elongated aperture which receives a corresponding locator pin extending from the second lid surface of the second lid portion.

20. The closure panel assembly of claim 18, wherein the first lid surface of the first lid portion is bounded by opposing side walls defining a concave mounting recess, and wherein the first slide member is attached to one of the opposing side walls within the concave mounting recess.

\* \* \* \* \*